United States Patent [19]

Wambeke

[11] Patent Number: 5,730,561
[45] Date of Patent: Mar. 24, 1998

[54] UNIVERSAL CHOP SAW

[76] Inventor: James R. Wambeke, 503 E. 5th St., Minneota, Minn. 56264

[21] Appl. No.: 648,871

[22] Filed: May 16, 1996

[51] Int. Cl.$^6$ .................................................. B23B 45/02
[52] U.S. Cl. ........................ 408/118; 7/148; 30/122; 30/123; 30/390
[58] Field of Search ..................... 30/122, 123, 388, 30/390, 391; 7/148; 408/118, 119; 83/490

[56] References Cited

U.S. PATENT DOCUMENTS

| | | | |
|---|---|---|---|
| 2,496,716 | 2/1950 | Hanna | 83/490 |
| 3,469,313 | 9/1969 | Martin | 30/122 |
| 3,583,106 | 6/1971 | Dobbertin | 30/122 X |

*Primary Examiner*—Douglas D. Watts

[57] ABSTRACT

A new Universal Chop Saw for utilizing a normal grinding tool for cutting and drilling objects in hard to reach areas by simply coupling the present invention to the grinding tool and adjusting the present invention to the required angle. The inventive device includes a protecting means to protect the user from injury during utilization of the present invention, a swivel arm allowing the user to adjust the present invention to the required angle, a drive belt means, a drill bit coupler and a cutting means.

16 Claims, 6 Drawing Sheets

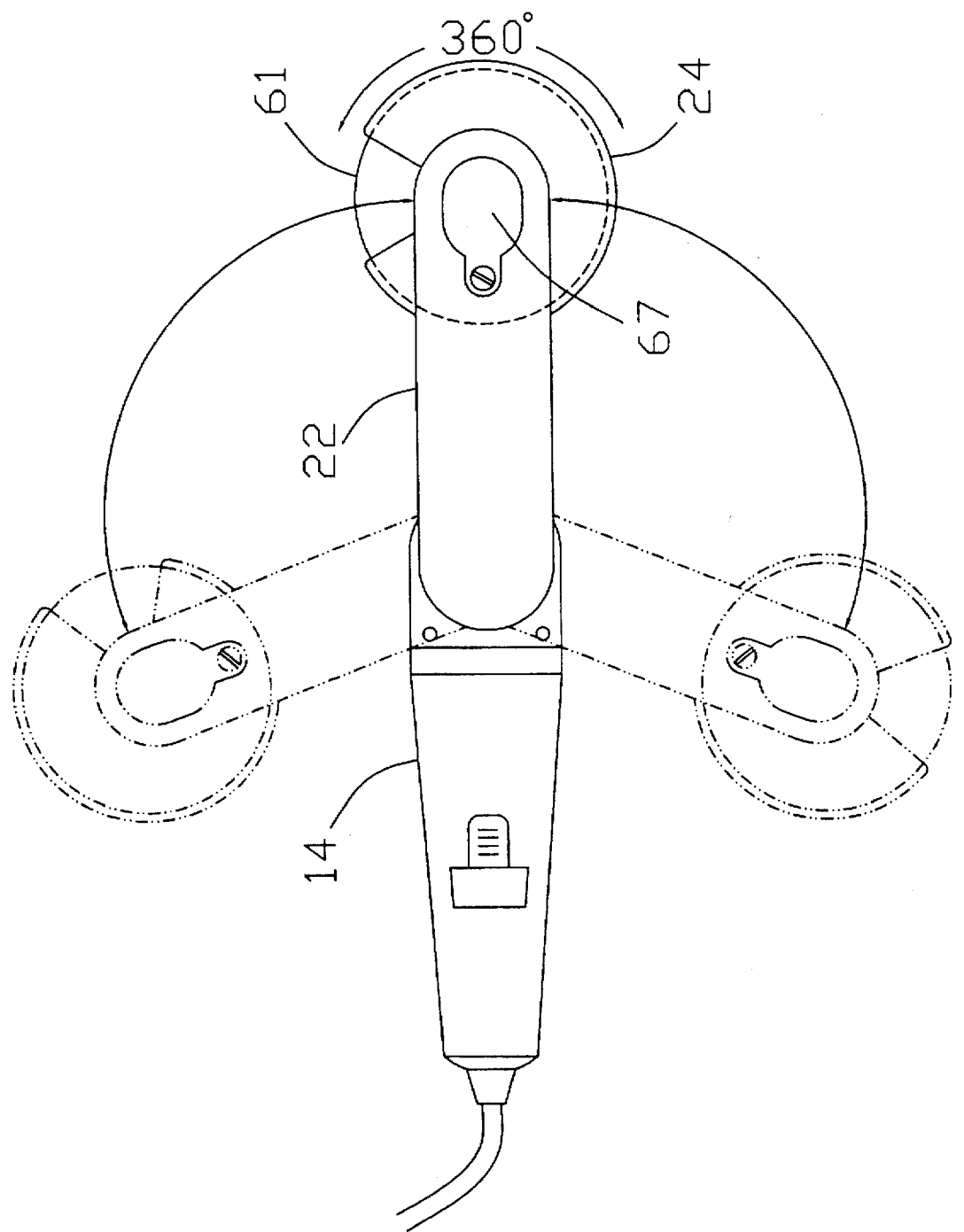

UNIVERSAL CHOP SAW

BACKGROUND OF THE INVENTION

1. Field of the Invention

The present invention relates to Rotary Tool Attachment Devices and more particularly pertains to a new Universal Chop Saw for utilizing a normal grinding tool for cutting and drilling objects in hard to reach areas by simply coupling the present invention to the grinding tool and adjusting the present invention to the required angle.

2. Description of the Prior Art

The use of Rotary Tool Attachment Devices is known in the prior art. More specifically, Rotary Tool Attachment Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Rotary Tool Attachment Devices include U.S. Pat. No. 5,313,709; U.S. Pat. No. 5,031,362; U.S. Pat. No. 4,615,117; U.S. Pat. No. 4,858,390; U.S. Pat. No. 5,389,861 and U.S. Pat. No. 4,578,906.

While these devices fulfill their respective, particular objectives and requirements, the aforementioned patents do not disclose a new Universal Chop Saw. The inventive device includes a protecting means to protect the user from injury during utilization of the present invention, a swivel arm allowing the user to adjust the present invention to the required angle, a drive belt means, a drill bit coupler and a cutting means.

In these respects, the Universal Chop Saw according to the present invention substantially departs from the conventional concepts and designs of the prior art, and in so doing provides an apparatus primarily developed for the purpose of utilizing a normal grinding tool for cutting and drilling objects in hard to reach areas by simply coupling the present invention to the grinding tool and adjusting the present invention to the required angle.

SUMMARY OF THE INVENTION

In view of the foregoing disadvantages inherent in the known types of Rotary Tool Attachment Devices now present in the prior art, the present invention provides a new Universal Chop Saw construction wherein the same can be utilized for utilizing a normal grinding tool for cutting and drilling objects in hard to reach areas by simply coupling the present invention to the grinding tool and adjusting the present invention to the required angle. The general purpose of the present invention, which will be described subsequently in greater detail, is to provide a new Universal Chop Saw apparatus and method which has many of the advantages of the Rotary Tool Attachment Devices mentioned heretofore and many novel features that result in a new Universal Chop Saw which is not anticipated, rendered obvious, suggested, or even implied by any of the prior art Rotary Tool Attachment Devices, either alone or in any combination thereof.

To attain this, the present invention generally comprises a protecting means to protect the user from injury during utilization of the present invention, a swivel arm allowing the user to adjust the present invention to the required angle, a drive belt means, a drill bit coupler and a cutting means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Universal Chop Saw apparatus and method which has many of the advantages of the Rotary Tool Attachment Devices mentioned heretofore and many novel features that result in a new Universal Chop Saw which is not anticipated, rendered obvious, suggested, or even implied by any of the prior art Rotary Tool Attachment Devices, either alone or in any combination thereof.

It is another object of the present invention to provide a new Universal Chop Saw which may be easily and efficiently manufactured and marketed.

It is a further object of the present invention to provide a new Universal Chop Saw which is of a durable and reliable construction.

An even further object of the present invention is to provide a new Universal Chop Saw which is susceptible of a low cost of manufacture with regard to both materials and labor, and which accordingly is then susceptible of low prices of sale to the consuming public, thereby making such Universal Chop Saw economically available to the buying public.

Still yet another object of the present invention is to provide a new Universal Chop Saw which provides in the apparatuses and methods of the prior art some of the advantages thereof, while simultaneously overcoming some of the disadvantages normally associated therewith.

Still another object of the present invention is to provide a new Universal Chop Saw for utilizing a normal grinding tool for cutting and drilling objects in hard to reach areas by simply coupling the present invention to the grinding tool and adjusting the present invention to the required angle.

Yet another object of the present invention is to provide a new Universal Chop Saw which includes a protecting means to protect the user from injury during utilization of the present invention, a swivel arm allowing the user to adjust the present invention to the required angle, a drive belt means, a drill bit coupler and a cutting means.

Even still another object of the present invention is to provide a new Universal Chop Saw wherein the user is able to easily adjust the present invention to a desired positioning angle to cut or drill objects in hard to reach areas without damaging surrounding structures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a top view illustrating the varying range of movement of the present invention.

DESCRIPTION OF THE PREFERRED EMBODIMENT

Figure 1:
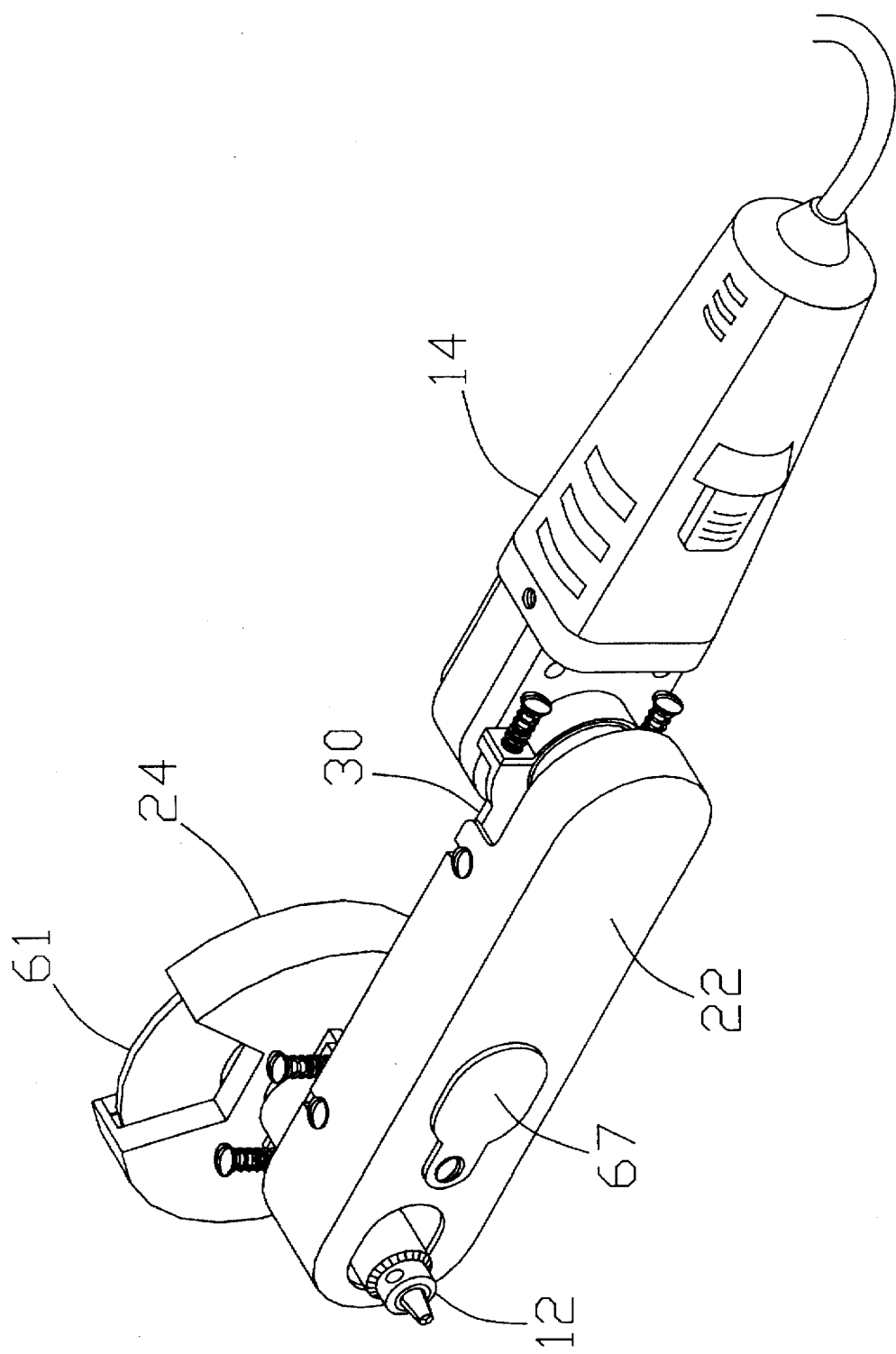
FIG. 1 is a left side perspective view of a new Universal Chop Saw according to the present invention.
Figure 2:
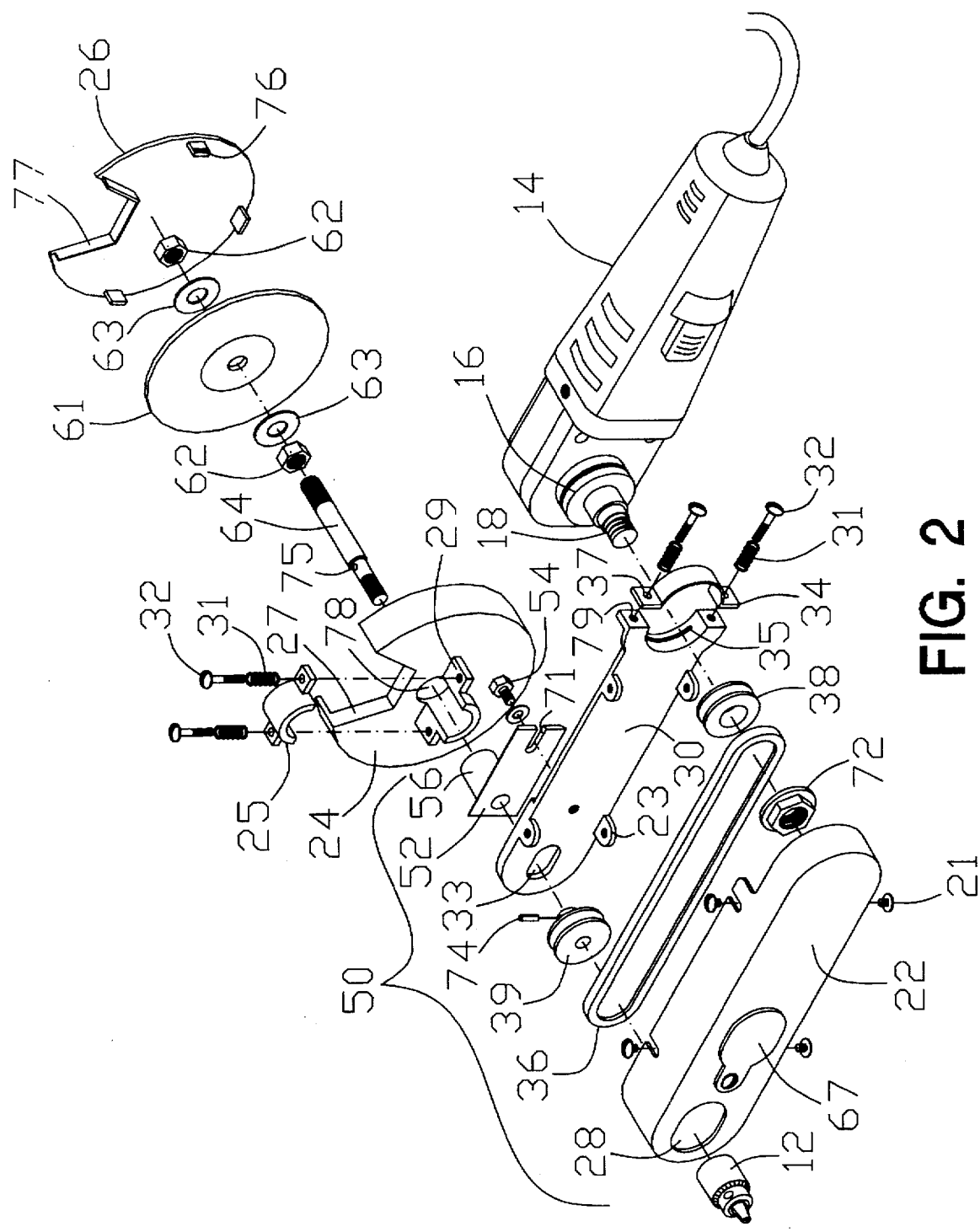
FIG. 2 is an exploded front perspective view of the Universal Chop Saw.
Figure 3:
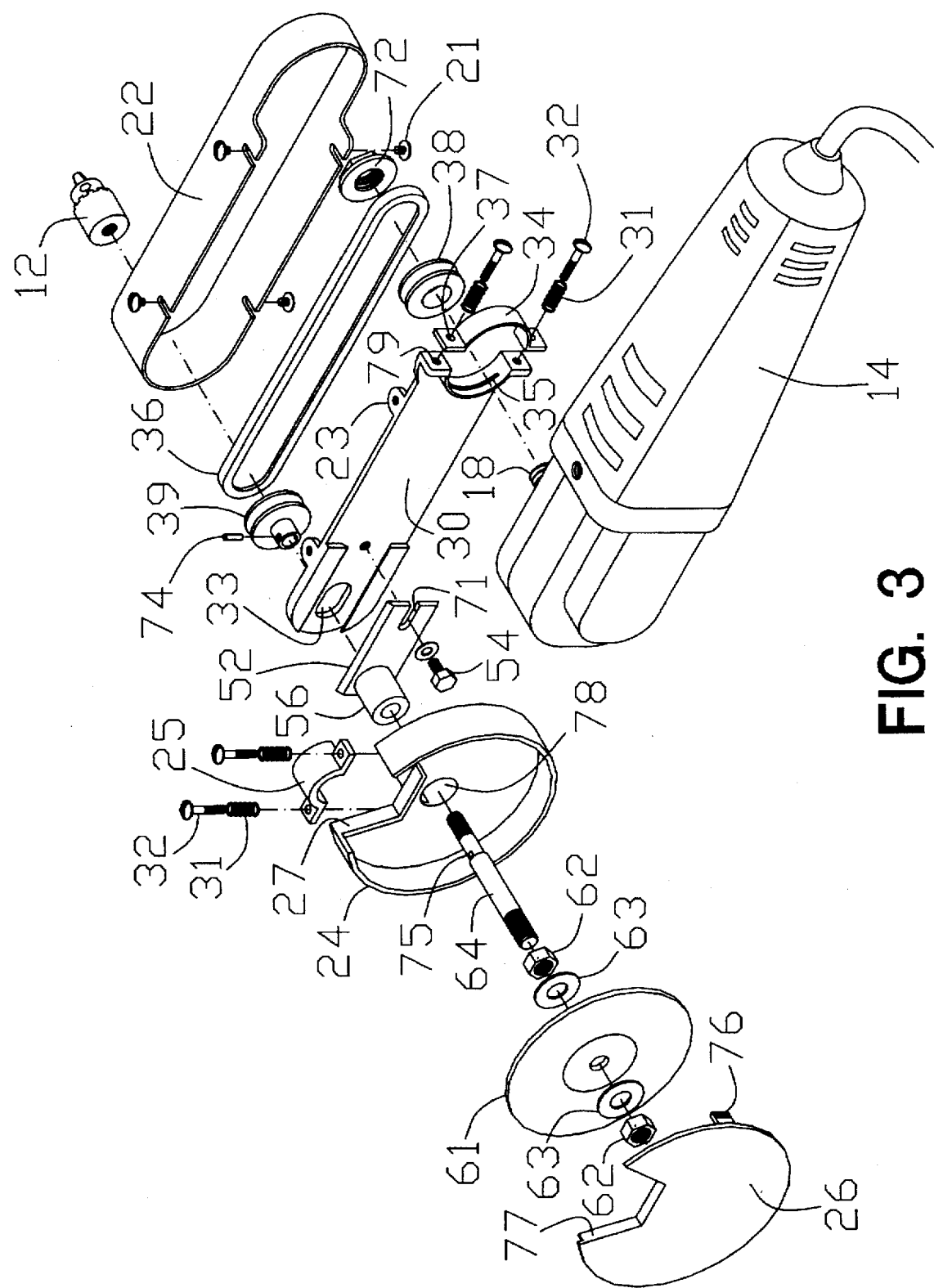
FIG. 3 is an exploded back perspective view of the present invention.
Figure 4:
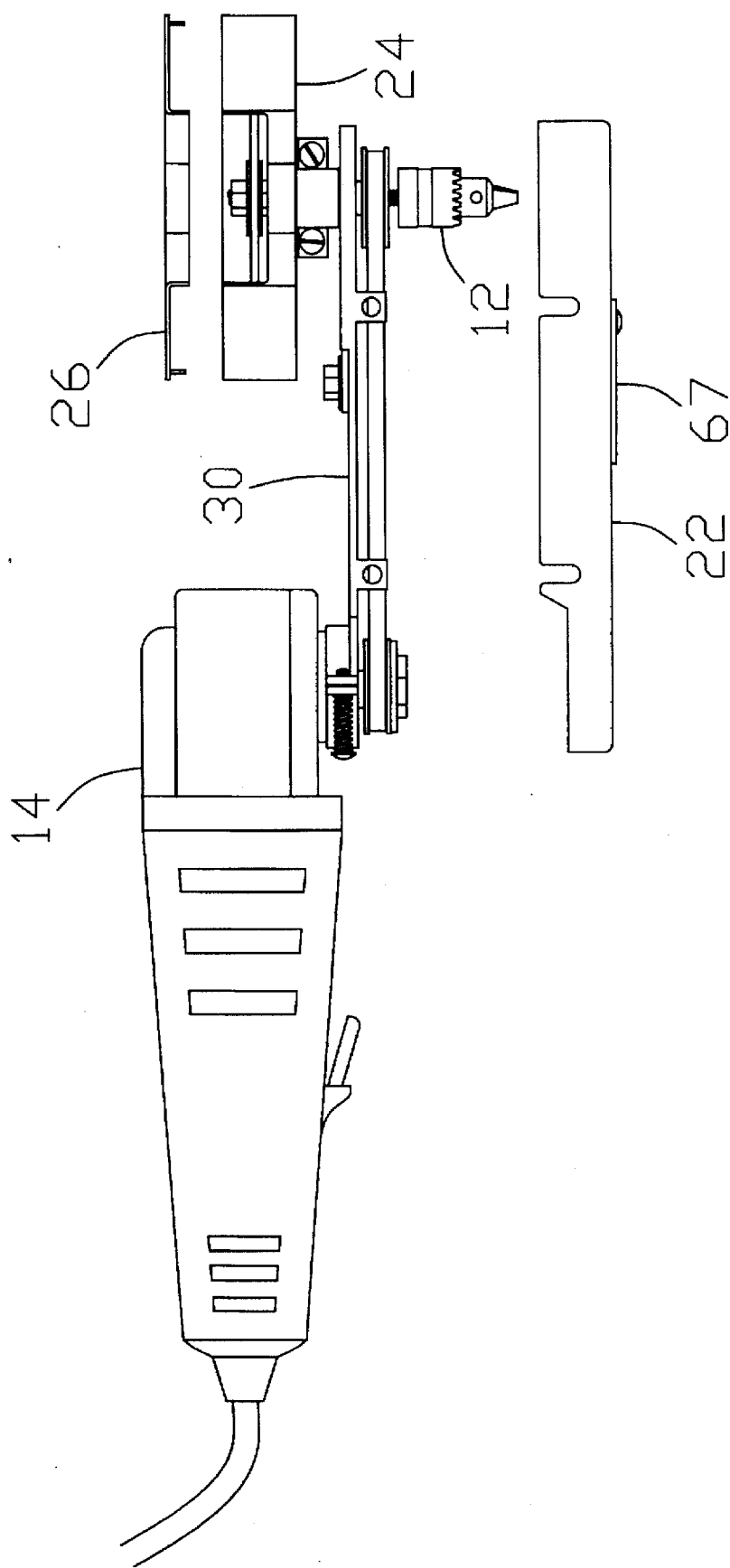
FIG. 4 is an exploded side view of the invention.
Figure 5:
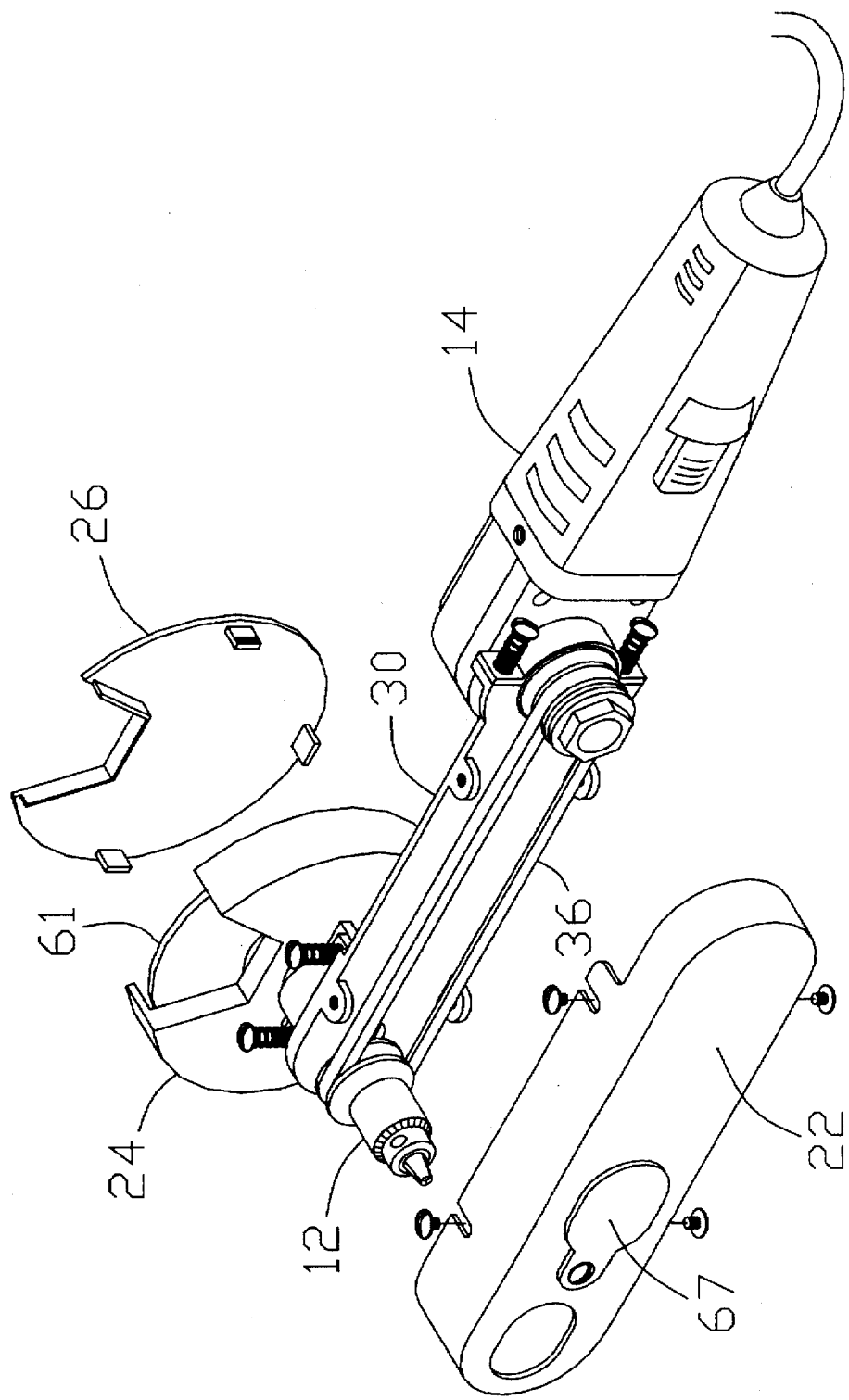
FIG. 5 is an exploded front perspective view of the Universal Chop Saw.

With reference now to the drawings, and in particular to FIGS. 1–6 thereof, a new Universal Chop Saw embodying the principles and concepts of the present invention and generally designated by the reference numeral 10 will be described.

More specifically, it will be noted that the Universal Chop Saw 10 comprises an elongated swivel arm 30 attached to a rotating tool 14, a drive belt means 50 secured to the swivel arm 30, a cutting means 60 secured to the swivel arm 30 opposite of the standard rotating tool 14, and a protecting means 20 mounted to the swivel arm 30 protecting the user from harm.

As best illustrated in FIGS. 1 through 5, it can be shown that a support sleeve notch 35 at one end of the swivel arm 30 is formed to the circumference of a cylindrical support sleeve 16 on the standard rotating tool 14 allowing coupling to the standard rotating tool 14. A U-shaped tool coupler 34 is formed to the circumference of the cylindrical support sleeve 16 on the standard rotating tool 14 wherein the U-shaped tool coupler 34 surrounds the cylindrical support sleeve 16 of the standard rotating tool 14 opposite of the support sleeve notch 35. A swivel arm fastener 32 projects through a swivel arm tension spring 31 though a corresponding tool coupler aperture 37 and then fastens into a swivel arm mounting aperture 79 pivotally mounting the present invention 10 to the standard rotating tool 14. A first drive pulley 38 secures onto a rotating tool drive shaft 18 by a first drive pulley fastener 72 allowing the standard rotating tool 14 to engage the present invention 10. A drive belt 36 has one end engaging the first drive pulley 38 extending a substantial length of the swivel arm 30 with the other end engaging a second drive pulley 39 mounted to a universal drive shaft 64. A second drive pulley pin 74 secures the second drive pulley 39 by projecting through the second drive pulley 39 and projecting further through a pulley pin aperture 75 in the universal drive shaft 64. The universal drive shaft 64 extends through the second drive pulley 74 coupling with a drill bit coupler 12 allowing attachment of drill bits to the present invention 10. The universal drive shaft 64 extends from the second drive pulley 39 projecting outward in the opposing direction of the drill bit coupler 12 through a slotted adjusting aperture 33 then projecting through a slotted support member 52, continuing through a first shield aperture 78 projecting through a cutting blade fastener 62 then through a cutting blade washer 63, then projecting through a cutting blade 61, then through another cutting blade washer 63 and terminating into another cutting blade fastener 62. A hollow shaft member 56 extends through the first shield aperture 78 and further comprising an elongated adjusting slot 71 opposite of the hollow shaft member 56 allowing the user to adjust the tightness of the drive belt 36. An adjuster fastener 54 adjustably secures the slotted support member 52 to the swivel arm 30 to allow manual tightening of the drive belt means 50 ensuring proper operation of the present invention 10. At least one drive belt shield mounting bracket 23 is secured to the upper portion or lower portion of the swivel arm 30. A drive belt shield 22 is mounted to the swivel arm 30 by a drive belt shield fastener 21 projecting through a slot into the drive belt shield mounting bracket 23. The drive belt shield 22 comprises a drill coupler aperture 28 allowing utilization of the drill bit coupler 12. A first cutting protective shield 24 encompasses the hollow shaft member 56. A secured U-shaped shield fastener 29 is secured to the center of the first cutting protective shield 24 engaging a corresponding U-shaped shield fastener 25 on the opposite side of the hollow shaft member 56 by the swivel arm fastener 32 projecting through the swivel arm tension spring 31. The swivel arm fastener 32 then projects through the U-shaped shield fastener 25 into the secured U-shaped shield fastener 29. The first cutting protective shield 24 further comprises a first U-shaped cutting notch 27 allowing entry of objects being cut. A second cutting protective shield 26 is attached to the first cutting protective shield 24 where the second cutting protective shield 26 has at least one cutting protective shield fastener 76 securing the second cutting protective shield 26 to the first cutting protective shield protecting the user from injury. The second cutting protective shield 26 further comprises a second U-shaped cutting notch 77 corresponding to the first U-shaped cutting notch 27. The present invention has a wide range of motion as shown in FIG. 6 of the drawings.

In use, the user secures the present invention to an existing rotating tool 14 by fastening the swivel arm 30 to the cylindrical support sleeve 16. The standard rotating tool 14 rotates the first drive pulley 38 which in turn engages the drive belt 36. The drive belt 36 then rotates the second drive pulley 39 which in turn rotates the universal drive shaft 64. The universal drive shaft 64 is coupled to the cutting blade 61 so as to rotate the cutting blade 61 at a significant speed. The user manually manipulates the positioning angle of the present invention by simply applying force to the swivel arm 30 thereby rotating the present invention to the desired position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A universal chop saw adapter for a rotating power tool having a substantially cylindrical support sleeve portion and a rotatable tool drive shaft located in said support sleeve portion, comprising:
   an elongated swivel arm having opposite ends, said swivel arm having coupling means on one said end for removably coupling said one end of said swivel arm to the support sleeve portion of a rotating power tool in a manner permitting swinging of said swivel arm in an arc with respect to said rotating power tool;
   a drive belt means secured to the swivel arm and being releasably engagable with said tool drive shaft such that said tool drive shaft drives said drive belt means;
   a cutting means mounted on the end of said swivel arm opposite said coupling means; and
   a protecting means mounted to the swivel arm for protecting a user from contact with said cutting means;
   wherein the coupling means of said swivel arm comprises:
   a support sleeve notch formed on said one end of said swivel arm;
   a substantially U-shaped tool coupler removably mounted on said one end of said swivel arm adjacent to said support sleeve notch to form an opening with said support sleeve notch for removably receiving the circumference of the cylindrical support sleeve portion of the rotating power tool;
   a swivel arm fastener fastening said tool coupler to said swivel arm, and
   a swivel arm tension spring through which said swivel arm fastener passes to bias said tool coupler toward said support sleeve notch such that said opening is expandable to receive the cylindrical support sleeve and such that said support sleeve notch and said tool coupler notch frictionally engage the circumference of said support sleeve.

2. A universal chop saw adapter for a rotating power tool having a substantially cylindrical support sleeve portion and a rotatable tool drive shaft located in said support sleeve portion comprising:
   an elongated swivel arm having opposite ends, said swivel arm having coupling means on one said end for removably coupling said one end of said swivel arm to the support sleeve portion of a rotating power tool in a manner permitting swinging of said swivel arm in an arc with respect to said rotating power tool;
   a drive belt means secured to the swivel arm and being releasably engagable with said tool drive shaft such that said tool drive shaft drives said drive belt means;
   a cutting means mounted on the end of said swivel arm opposite said coupling means; and
   a protecting means mounted to the swivel arm for protecting a user from contact with said cutting means;
   wherein the drive belt means comprises a first drive pulley securable to a rotating tool drive shaft of said rotating power tool in a manner permitting said drive shaft to drive said first drive pulley:
   wherein the drive belt means further comprises a drive belt with one end engaging the first drive pulley, said drive belt extending along the length of the swivel arm, said drive belt means further comprising a second drive pulley mounted on said swivel arm opposite said first drive pulley and being engaged by said drive belt; and
   wherein the universal drive shaft extends through the second drive pulley, additionally comprising a drill bit coupler for accepting a drill bit therein.

3. A universal chop saw adapter for a rotating power tool having a substantially cylindrical support sleeve portion and a rotatable tool drive shaft located in said support sleeve portion, comprising
   an elongated swivel arm having opposite ends, said swivel arm having coupling means on one said end for removably coupling said one end of said swivel arm to the support sleeve portion of a rotating power tool in a manner permitting swinging of said swivel arm in an arc with respect to said rotating power tool:
   a drive belt means secured to the swivel arm and being releasably engagable with said tool drive shaft such that said tool drive shaft drives said drive belt means;
   a cutting means mounted on the end of said swivel arm opposite said coupling means;
   a protecting means mounted to the swivel arm for protecting a user from contact with said cutting means; and
   a drill bit coupler mounted on an end of said swivel arm opposite said coupling means and adjacent to said cutting means.

4. The universal chop saw adapter of claim 3 wherein the drive belt means comprises a first drive pulley securable to a rotating tool drive shaft of said rotating power tool in a manner permitting said drive shaft to drive said first drive pulley.

5. The universal chop saw adapter of claim 4, wherein the drive belt means further comprises a drive belt with one end engaging the first drive pulley, said drive belt extending along the length of the swivel arm, said drive belt means further comprising a second drive pulley mounted on said swivel arm opposite said first drive pulley and being engaged by said drive belt.

6. The universal chop saw adapter of claim 2 wherein the drive belt means further comprises an adjuster fastener for adjusting the spacing between the first and second drive pulleys to thereby permit manual tightening of the drive belt means.

7. The universal chop saw adapter of claim 2 wherein the swivel arm includes a drive belt shield mounted on the swivel arm.

8. The universal chop saw adapter of claim 3 wherein said cutting means comprises a substantially disk-shaped cutting blade.

9. The universal chop saw adapter of claim 3 wherein said coupling means is adapted to permit swinging of said swivel arm in an arc of at least 90 degrees.

10. The universal chop saw adapter of claim 3 wherein the protecting means comprises a drive belt shield mounted to the swivel arm for shielding said drive belt means from contact with a user.

11. The universal chop saw adapter of claim 3 wherein the protecting means comprises a first cutting protective shield for partially enclosing the cutting means.

12. The universal chop saw adapter of claim 3 wherein said coupling means is adapted to frictionally engage the cylindrical support sleeve of a rotating power tool.

13. The universal chop saw adapter of claim 3 wherein the first cutting protective shield comprises a first substantially U-shaped cutting notch allowing contact between said cutting means and an object to be cut.

14. The universal chop saw adapter of claim 13 wherein the protecting means further comprises a second cutting protective shield attached to the first cutting protective shield.

15. The universal chop saw adapter of claim 14 wherein the second cutting protective shield comprises at least one cutting protective shield fastener engaging the first cutting protective shield to secure the second cutting protective shield.

16. The universal chop saw adapter of claim 15 wherein the second cutting protective shield comprises a second U-shaped cutting notch corresponding to the first U-shaped cutting notch.

* * * * *